United States Patent Office 3,629,160
Patented Dec. 21, 1971

3,629,160
NOVEL DIALKYL SULFOXIDE-ORGANO METALLIC CO-CATALYST SYSTEM AND THE POLYMERIZATION OF EPOXIDES THEREWITH
Leonard A. Tushaus, South Bloomington, Minn., assignor to Ashland Oil & Refining Company, Houston, Tex.
No Drawing. Filed Aug. 8, 1968, Ser. No. 751,050
Int. Cl. C08g 23/06, 23/14
U.S. Cl. 260—2    5 Claims

ABSTRACT OF THE DISCLOSURE

Epoxides, especially higher olefin oxides (e.g., dodecene oxide), are polymerized by heating in the presence of a co-catalyst system comprising (a) an organo-metallic compound of the formula $MeRR_x'$, in which Me is a Group II or III metal, R is hydrocarbyl, R' is hydrogen, hydrocarbyl, alkoxy, or secondary amino, and $x$ is the valency of Me minus one (e.g., triethylaluminum and diethyl zinc) and (b) a dialkyl sulfoxide (e.g., dimethylsulfoxide).

---

This invention relates to the polymerization of vicinal epoxide compounds. More specifically, this invention relates to the polymerization of vicinal epoxide compounds by the use of a novel catalyst system comprising an organo-metallic compound and a di-lower alkyl sulfoxide.

The polymerization of a variety of vicinal epoxide compounds, especially the lower alkylene oxides such as ethylene oxide and propylene oxide, is well-known in the art. In U.S. Pat. 2,870,100, for instance, the polymerization of epoxidized mono-olefinic hydrocarbons, especially those containing two to four carbon atoms, is disclosed. The catalysts disclosed in this patent include one of the components of the catalyst system utilized in the method of this invention. It has now been found, however, that certain improvements in the polymerization of vicinal epoxides, especially 1,2-olefin oxides having ten or more carbon atoms, can be attained by using the catalyst system of this invention.

It is, therefore, an object of this invention to provide an improved catalyst system for the polymerization of vicinal epoxide compounds.

It is a further object of this invention to provide a catalyst system for the polymerization of higher alkylene oxides.

Still another object of this invention is to provide solid polymers of higher alkylene oxides.

The polymerization of vicinal epoxides according to the present invention is accomplished by the use of a novel catalyst system for the polymerization of vicinal-epoxide compounds. The novel catalyst system comprises an organo-metallic compound of a Group II or III metal in combination with a di-lower alkyl sulfoxide. For convenience in the following discussion, the organo-metallic is designated the "catalyst," the sulfoxide is designated the "co-catalyst," and the mixture the "catalyst system."

The organo-metallic compound which comprises the "catalyst" of the catalyst system in this invention has the formula $MeRR_x'$, wherein Me is a polyvalent metal selected from Groups II and III of the Periodic Table, R is a hydrocarbon radical, each R' is a member of the class consisting of a hydrogen atom, a halogen atom, a hydrocarbon radical, an alkoxy radical, and a secondary amino radical, and $x$ is the valency of the metal Me minus one. The metal in the catalyst is any of the Group II or III metals such as Be, Mg, Ca, Sr, Ba, Ra, Zn, Cd, Hg, Al, Ga, In, Tl, Sc, Y, La, and Ac. The hydrocarbon radicals are of any type including aliphatic, aromatic, and alicyclic radicals as exemplified by methyl, ethyl, propyl, isopropyl, isobutyl, tert-butyl, allyl, oleyl, propargyl, phenyl, cresyl, xylyl, ethylphenl, benzl, cinnamyl, naphthyl, cyclopentyl, cyclohexyl, cyclohexenyl, and related groups. The halogen atom or atoms contained in the organo-metallic catalyst are fluorine, chlorine, bromine, and/or iodine. Representative alkoxy radicals in the catalyst include methoxy, ethoxy, isopropoxy, tertbutoxy, octoxy, and like groups.

The hydrocarbon radical or radicals in the catalyst used in the process of the invention are preferably straight or branched chain alkyl radicals containing up to 10 carbon atoms. The secondary amino radical or radicals, when present, is or are attached to the metal (Me) through the nitrogen atom which may form part of a ring as for example the piperidyl radical. The organo-metallic catalysts are known compounds. Preferred catalysts include triethylaluminum, triisopropylaluminum, tributylaluminum, dimethyl zinc, diethyl zinc, and di-phenyl zinc.

The di-lower alkyl sulfoxides which comprise the "co-catalyst" of the catalyst system of this invention have the formula

in which each R is independently lower alkyl radical having 1 to 4 carbon atoms or cycloalkyl having 3 to 8 carbon atoms. Typical radicals include, for example, methyl, ethyl, and propyl, isopropyl, butyl, t-butyl, cyclophentyl, and cyclohexyl.

Illustrative di-alkyl sulfoxides include, for instance, dimethyl sulfoxide, methyl ethyl sulfoxide, methyl propyl sulfoxide, diethyl sulfoxide, di-n-propyl sulfoxide, di-n-butyl sulfoxide, and di-cyclohexyl sulfoxide. Dimethyl sulfoxide is the most preferred.

The catalyst system of the present invention can be employed with any polymerizable vicinal epoxide. Suitable polymerizable epoxide compounds include ethylene oxide, propylene oxide, styrene oxide, 1,2-butylene oxide, 1,2-pentylene oxide, allyl glycidyl ether, vinyl cyclohexene oxide, phenyl glycidyl ether.

The preferred vicinal-epoxide compounds are those having the formula

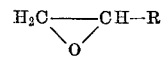

wherein R is a saturated aliphatic hydrocarbon radical having from about 8 to about 20 carbon atoms. Illustrative of such preferred compounds are 1,2-decene oxide, 1,2-undecene oxide, 1,2-dodecene oxide, 1,2-hexadecene oxide, 1,2-octadecene oxide, 1,2- eicosene oxide, and the like, including mixtures thereof. The mixtures assume technical importance, especially in the long chain compounds, since terminal mono-olefin mixed fractions are commercially available from petrochemical sources. These mixtures can be epoxidized to prepare monomers which are particularly useful in this invention. 1,2-dodecene oxide and mixtures thereof may be mentioned as particularly useful monomers in the practice of this invention.

The catalyst system of this invention can be made in any convenient manner, that is the "catalyst" and "co-catalyst" can be pre-mixed before addition to the polymerization mix, or they can be added separately in any order to produce the catalyst system in-situ in the reaction mix. The molar ratio of the co-catalyst (sulfoxide) to the catalyst (organo-metallic), in any case, should be in the range of 0.1:1 and 3.0:1. A preferred ratio is in the range of 0.1:1 and 1.5:1.

The amount of the catalyst system can vary widely. Generally, amounts of the catalyst system providing .1 to 5.0 mole percent of the catalyst (organo-metallic) per mole of vicinal epoxide compound are preferred.

The process of this invention is carried out by contacting vicinal-epoxides compounds in an inert mixture in contact with the catalyst system which is the subject of this invention. The polymerization reaction can be carried out in the presence of an inert solvent, e.g., an aromatic hydrocarbon, an aliphatic hydrocarbon, or a chlorinated hydrocarbon. Useful solvents include benzene, toluene, xylene, isopentane, n-hexene, octane, carbon tetrachloride, ethylene dichloride, propylene dichloride, and the like. The reaction also can be conducted in bulk without a solvent. The solvent reaction medium is preferred as a convenient means of handling the catalyst system.

The temperatures at which the polymerization is carried out can vary from 25° C. to about 150° C. or higher. Temperatures in the 90–120° C. range are preferred. The pressure under which the polymerization reaction is conducted varies from about atmospheric pressure to about 40 or more atmospheres. The polymerization reaction occurs in the liquid phase, and, therefore, sufficient pressure is employed to keep the epoxide compound in a liquid condition regardless of whether or not an inert solvent is present in the reaction mixture. The choice of catalyst system, ratio of catalyst to co-catalyst, temperature, and pressure all affect molecular weight and, consequently, are a method of controlling the molecular weight.

The process of this invention can be executed in a closed reaction vessel in either a batch or a continuous process. The catalyst system or a solution of the catalyst system in a solvent is generally added to the epoxide compound which also may or may not be in a solvent, but the addition can be in the reverse order if desired. The mixture of epoxide compound in contact with the co-catalyst is then allowed to stand or is heated to the desired temperature for a time sufficient to obtain a substantial amount of the polymer. Batch processes are usually conducted by contacting the epoxide compound and catalyst system together in a closed reaction vessel wherein the desired polymerization occurs with or without stirring or mixing of the reaction mixture. For large scale production it is more convenient to effect the polymerization in a continuous fashion with the use of a residence reactor as is well-known in the art. In such operation, a mixture of the epoxide compound, catalyst system, and solvent, if any, is charged to a vessel fitted with an external pump connected by pipes to more or less opposite points of the reaction vessel whereby agitation and circulation are provided. After the desired extent of polymerization has occurred, a fresh charge of reactant materials is fed continuously or intermittently and corresponding amounts of the reactant mixtures are withdrawn. A steady state is reached and the desired polymer is produced in a continuous fashion. The excess or unreacted epoxide compound remaining in the reaction mixture after completion of the desired extent of polymerization is separated or recovered from the reaction mixture. This can be accomplished by dissolving the reaction mixture in a solvent and precipitating the polymer in a non-solvent for the resin. The precipitating solvent may advantageously be a lower alkanol to which a small amount of mineral acid such as hydrochloric acid is added to aid in the extraction of the co-catalyst.

The products formed in the process of this invention are high molecular weight polymeric or co-polymeric poly-ethers. The resinous and rubbery polymeric materials, alone or in admixture with each other, or other polymeric materials, are useful as coatings for fabrics, films for packaging materials, elastic fibers or thread, golf balls, adhesives in making tires, gaskets, molded articles, and the like. They may be vulcanized by methods well-known in the polymer art to give products with different and useful properties.

Although the invention has been described in considerable detail with reference to certain preferred embodiments, it will be understood that variations and modifications can be effected within the spirit and scope of the invention as described above and defined in the appended claims.

EXAMPLE 1

This example illustrates the polymerization of 1,2-dodecene oxide utilizing diethyl zinc/dimethyl sulfoxide co-catalyst in the method of this invention.

Pure vicinal epoxide compound (1,2-dodecene oxide) is weighed into a polymerization bottle. A calculated amount of di-alkyl sulfoxide (dimethyl sulfoxide) is added by means of a hypodermic syringe. The bottle is flushed with nitrogen, sealed with a rubber cap, and again flushed with nitrogen through a hypodermic needle. A calculated amount of a 1.5 molar solution of the organo-metallic compound (diethyl zinc) in heptane is added by means of a syringe. The bottle is then placed in a heated bath (100° to 115° C.) for a certain length of time (16.5 to 26 hours). At the end of this time, the bottle is removed from the bath and cooled.

In this example, the vicinal epoxide is 1,2-dodecene oxide, the catalyst is diethyl zinc, and the co-catalyst is dimethyl sulfoxide (DMSO). After the polymerization reaction is completed, the cap is removed from the bottle and the bottle is broken to free the polymer which is hard and rubbery. The polymer is dissolved in toluene containing 2,6-di-tert-butyl-p-cresol as a stabilizer and then precipitated by pouring the toluene solution into a Waring blender containing methanol containing a small amount of hydrochloric acid. The polymer is redissolved in toluene and reprecipitated as before. After drying under vacuum, a white, stringy, fluffy polymer is obtained.

A series of polymerization reactions were conducted in which (a) the mole percent of diethyl zinc relative to the vicinal-epoxide monomer, (b) the mole ratio of DMSO to di-ethyl zinc, (c) the reaction temperature, and (d) the reaction time were varied. The results are tabulated in Table I below:

TABLE I

| Mole percent diethylzinc | Moles of DMSO per mole of diethylzinc | Reaction temp. ° C. | Reaction time (hrs.) | Percent conversion | Inherent viscosity* |
|---|---|---|---|---|---|
| 0.5 | 1    | 115 | 16.5 | 16.3 | 0.77 |
| 0.5 | 2    | 115 | 16.5 | 1.4  | 0.33 |
| 1.0 | 1    | 110 | 16.5 | 36.2 | 1.28 |
| 1.0 | 1.5  | 110 | 16.5 | 42.2 | 1.22 |
| 1.0 | 0.5  | 100 | 18.5 | 67.6 | 2.53 |
| 1.0 | 1    | 100 | 18.5 | 49.0 | 2.12 |
| 1.0 | 1.5  | 100 | 18.5 | 33.3 | 1.87 |
| 1.0 | 0.25 | 100 | 26   | 70.6 | 3.40 |
| 1.0 | 0.5  | 100 | 24   | 83.3 | 2.48 |
| 1.0 | 1    | 100 | 24   | 68.0 | 1.95 |
| 1.5 | 0.25 | 100 | 26   | 26.7 | 3.47 |
| 1.5 | 0.5  | 100 | 24   | 57.3 | 2.79 |
| 1.5 | 1    | 100 | 24   | 61.0 | 2.00 |
| 2.0 | 0.25 | 100 | 26   | 24.4 | 3.33 |
| 2.0 | 0.5  | 100 | 24   | 33.8 | 2.82 |
| 2.0 | 1    | 100 | 24   | 54.5 | 1.66 |

*0.5 g./100 cc. toluene.

EXAMPLE 2

This example illustrates the polymerization of 1,2-dodecene oxide utilizing triethylaluminum/dimethyl sulfoxide co-catalyst in the method of this invention.

The method of Example 1 was followed except that triethylaluminum was used as the organo-metallic portion of the co-catalyst. The results are tabulated in Table II below.

TABLE II

| Mole percent diethylzinc | Moles of DMSO per mole of diethylzinc | Reaction temp. °C. | Reaction time (hrs.) | Percent conversion | Inherent viscosity* |
|---|---|---|---|---|---|
| 1 | 0.5 | 100 | 24 | 15.8 | 1.18 |
| 1 | 1.0 | 100 | 24 | 6.0 | 0.88 |
| 1 | 1.5 | 100 | 24 | 2.7 | 1.08 |
| 1 | 2.0 | 100 | 24 | 1.6 | 0.86 |
| 1 | 3.0 | 100 | 24 | 0.5 | 0.99 |

* 0.5 g./100 cc. toluene.

EXAMPLE 3

This example illustrates the polymerization of propylene oxide utilizing diethyl zinc/dimethyl sulfoxide co-catalyst in the method of this invention.

The method of Example 1 was repeated except that the monomer is propylene oxide instead of 1,2-dodecene oxide. The results are tabulated in Table III below.

TABLE III

| Mole percent diethylzinc | Moles of DMSO per mole of diethylzinc | Reaction temp. °C. | Reaction time (hrs.) | Percent conversion | Inherent viscosity* |
|---|---|---|---|---|---|
| 1 | 0.25 | 60 | 96 | 1.8 | |
| 1 | 0.5 | 60 | 96 | 5.0 | |
| 1 | 1 | 60 | 96 | 15.8 | |
| 1 | 1.5 | 60 | 96 | 11.5 | |
| 1 | 1 | 60 / 90 | 12 / 50 | 61.3 | 1.8 |

* 0.5 g./100 cc. toluene.

EXAMPLE 4

This example illustrates the polymerization of allyl glycidyl ether utilizing diethyl zinc/dimethyl sulfoxide co-catalyst in the method of this invention.

The method followed was as in Example 1 except that allyl glycidyl ether was used as vicinal-epoxide monomer instead of 1,2-dodecene oxide. The results are tabulated in Table IV below.

TABLE IV

| Mole percent diethylzinc | Moles of DMSO per mole of diethylzinc | Reaction temp. °C. | Reaction time (hrs.) | Percent conversion | Inherent viscosity* |
|---|---|---|---|---|---|
| 1 | 0.25 | 75 | 26.5 | 10.5 | Gummy. |
| 1 | 0.5 | 75 | 26.5 | 19.3 | Do. |
| 1 | 1 | 75 | 26.5 | 17.5 | Do. |

* 0.5 g./100 cc. toluene.

Although the invention has been illustrated by reference to certain preferred embodiments, it will be understood that variations and modifications can be effected within the spirit and scope of the invention as described above and as defined in the appended claims.

What is claimed is:

1. A method for the polymerization of epoxide compounds which comprises contacting polymerizable vicinal mono-epoxide compounds at a temperature of about 25° C. to 150° C., in the presence of a catalyst system comprising:
   (A) triethyl aluminum; and
   (B) dimethyl sulfoxide;
said organo-metallic compound is in an amount from 0.1 to 5.0 mole percent of said vicinal-epoxide compounds; and the molar ratio of said sulfoxide (B) to said organo-metallic (A) is between 0.1:1 and 3.0:1.

2. The method of claim 1 wherein the molar ratio of dimethyl sulfoxide to triethyl aluminum is between 0.1:1 and 1.5:1.

3. The method of claim 1 wherein said vicinal mono-epoxide compound has the formula:

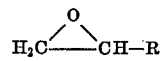

wherein R is selected from the group consisting of hydrogen, alkyl having up to 20 carbon atoms.

4. The method of claim 3 wherein R is alkyl having from 8 to 20 carbon atoms.

5. The method of claim 1 wherein said vicinal-epoxide compound is 1,2-dodecene oxide.

References Cited

UNITED STATES PATENTS

| | | | |
|---|---|---|---|
| 3,135,705 | 6/1964 | Vandenberg | 260—2 |
| 3,135,706 | 6/1964 | Vandenberg | 260—2 |
| 3,313,743 | 4/1967 | Filar et al. | 260—2 |
| 3,324,051 | 6/1967 | Lal | 260—2 |

OTHER REFERENCES

Furukawa et al.: J. Poly. Sci., A–1, 5, 3139–3141, 3143, and 3148, December 1967.

Chemical Abstracts, 68, 50116s (1968).

WILLIAM H. SHORT, Primary Examiner

E. A. NIELSEN, Assistant Examiner

U.S. Cl. X.R.

252—431; 260—47, 91.1, 615